(12) United States Patent
Takahashi et al.

(10) Patent No.: US 11,385,128 B2
(45) Date of Patent: Jul. 12, 2022

(54) OPTICAL DEVICE LOSS MEASUREMENT APPARATUS, AND OPTICAL DEVICE LOSS MEASUREMENT METHOD

(71) Applicant: Nippon Telegraph and Telephone Corporation, Tokyo (JP)

(72) Inventors: Hiroshi Takahashi, Musashino (JP); Kunihiro Toge, Musashino (JP); Tomokazu Oda, Musashino (JP); Tetsuya Manabe, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/266,038

(22) PCT Filed: Aug. 1, 2019

(86) PCT No.: PCT/JP2019/030327
§ 371 (c)(1),
(2) Date: Feb. 4, 2021

(87) PCT Pub. No.: WO2020/031862
PCT Pub. Date: Feb. 13, 2020

(65) Prior Publication Data
US 2021/0381925 A1    Dec. 9, 2021

(30) Foreign Application Priority Data
Aug. 9, 2018   (JP) .............................. JP2018-150529

(51) Int. Cl.
*G01M 11/00*        (2006.01)
(52) U.S. Cl.
CPC .... *G01M 11/3109* (2013.01); *G01M 11/3145* (2013.01)

(58) Field of Classification Search
CPC .. G01M 11/30; G01M 11/31; G01M 11/3109; G01M 11/3118; G01M 11/3127;
(Continued)

(56) References Cited

U.S. PATENT DOCUMENTS 9,252,872 B2 *  2/2016  Hamaguchi ........ H04B 10/0795
2020/0408636 A1 * 12/2020 Takahashi .......... G01M 11/0285
(Continued)

FOREIGN PATENT DOCUMENTS

JP    2009-257973 A    11/2009
JP    2017-003339 A     1/2017
(Continued)

OTHER PUBLICATIONS

H. Kubota, Y. Miyoshi, M. Ohashi, T. Mori, T. Matui, and K. Nakajima, "Mode-dependent loss measurement of a two-mode fiber using a conventional OTDR," IEICE Commum. Express, Sep. 9, 2016, vol. 5, No. 11, pp. 429-434.
(Continued)

*Primary Examiner* — Gordon J Stock, Jr.
(74) *Attorney, Agent, or Firm* — Workman Nydegger

(57) ABSTRACT

An optical test system capable of accurately measuring a loss of each mode at each position of an optical fiber which propagates a plurality of modes is provided. An optical fiber loss measuring apparatus for measuring using an OTDR technique includes a crosstalk suppressing light input unit that inputs light of a different mode different from the predetermined mode, the different mode causing crosstalk to the probe light, to the target optical fiber to be measured through the near end as crosstalk suppressing light at a second frequency obtained by giving a frequency that is equivalent to a Brillouin frequency shift of the predetermined mode to a first frequency, a light separating unit that removes light of the second frequency from light that is
(Continued)

output from the target optical fiber to be measured through the near end to separate light of the first frequency, and a propagation mode loss measuring unit that measures an intensity of the separated light to measure a loss of each propagation mode at each position of the target optical fiber to be measured.

8 Claims, 5 Drawing Sheets

(58) Field of Classification Search
CPC ......... G01M 11/3136; G01M 11/3145; G01M 11/3154; G01M 11/3163; G01M 11/3172; G01M 11/3181; G01M 11/319; H04B 10/071; G01D 5/35354; G01D 5/35358; G01D 5/35361; G01D 5/35364; G01D 5/35367
See application file for complete search history.

(56) References Cited

U.S. PATENT DOCUMENTS

| | | | |
|---|---|---|---|
| 2021/0018343 A1* | 1/2021 | Takahashi | G01D 5/353 |
| 2021/0310897 A1* | 10/2021 | Oda | G01M 11/39 |
| 2021/0356358 A1* | 11/2021 | Nakamura | G01M 11/3127 |
| 2021/0381926 A1* | 12/2021 | Nakamura | G01M 11/3109 |

FOREIGN PATENT DOCUMENTS

| | | | |
|---|---|---|---|
| JP | 2017040576 A | * | 2/2017 |
| JP | 2017-072495 A | | 4/2017 |
| JP | 2017-120186 A | | 7/2017 |
| WO | WO-2021070319 A1 | * | 4/2021 |

OTHER PUBLICATIONS

International Preliminary Report on Patentability, dated Feb. 9, 2021, from PCT/JP2019/030327 filed Aug. 1, 2019.

Nakazawa, Masataka et al., Measurement of mode coupling distribution along a few-mode fiber using a synchronous multi-channel OTDR, Optics Express, Dec. 11, 2014, 31299-31309, vol. 22. No. 25, Optical Society of America.

Takahashi, Hiroshi et al., Crosstalk Manipulation of Stimulated Brillouin Scattering for FMF Measurement, Proceedings of the 2018 IEICE general conference, Mar. 20, 2018, p. 309 (B-13-18), non-official translation.

* cited by examiner

OPTICAL DEVICE LOSS MEASUREMENT APPARATUS, AND OPTICAL DEVICE LOSS MEASUREMENT METHOD

TECHNICAL FIELD

The present disclosure relates to an optical fiber loss measuring apparatus and an optical fiber loss measuring method, and more particularly to an optical fiber loss measuring apparatus and an optical fiber loss measuring method for measuring a loss of each propagation mode of an optical fiber transmission line in a distributed and non-destructive manner in an optical fiber which propagates a plurality of modes or an optical transmission system using the same.

BACKGROUND ART

In recent years, the traffic volume of backbone communication networks has increased remarkably and it is said that transmission with a large capacity in the order of petabits per second per core will be required in the future. Mode multiplexing transmission using a few mode optical fiber that propagates a plurality of modes (hereinafter referred to as a Few Mode Fiber (FMF)) as an optical fiber that aims at such a large capacity and overcomes the capacity limit of single mode optical fibers used in current optical fiber transmission lines has received a great deal of attention.

To implement an optical transmission system using FMFs, it is necessary to evaluate the quality of optical fiber cables and connection points that constitute an optical fiber transmission line and to operate and maintain them for a long period of time. In the quality determination of an optical fiber transmission line, the loss of light is a main characteristic that limits the transmission capacity and distance. Especially, in an FMF transmission line, it is necessary to evaluate the loss of each mode because of its characteristic that signal transmission is performed for each mode.

Non Patent Literature 1 has proposed a technique in which, using an optical time domain reflectometer (Optical Time Domain Reflectometry, hereinafter referred to as OTDR) having a plurality of channels, any mode, for example $LP_{01}$, is excited into an FMF, and then backward Rayleigh scattered light caused by light of the $LP_{01}$ mode generated when propagating the FMF and backward Rayleigh scattered light caused by light coupled to a mode different from the exited mode, for example $LP_{11}$ mode, are used to evaluate the loss difference of each of the modes $LP_{01}$ and $LP_{11}$ in a distributed manner.

Non Patent Literature 2 has proposed a technique in which a mode filter for removing higher-order modes is disposed between an OTDR and a target optical fiber and the loss of each of the modes $LP_{01}$ and $LP_{11}$ is evaluated in a distributed manner based on two OTDR waveforms, one with the mode filter installed, and the other without it.

CITATION LIST

Non Patent Literature

Non Patent Literature 1: M. Nakazawa et al., "Measurement of mode coupling distribution along a few-mode fiber using a synchronous multi-channel OTDR" Opt. Express, Vol. 22, No. 25, pp. 31299-31309 (2014).
Non Patent Literature 2: H. Kubota, Y. Miyoshi, M. Ohashi, T. Mori, T. Matui, and K. Nakajima, "Mode-dependent loss measurement of a two-mode fiber using a conventional OTDR," IEICE Commum. Express, Vol. 5, pp. 429-434, (2016).

SUMMARY OF THE INVENTION

Technical Problem

According to the methods described in Non Patent Literatures 1 and 2, backward Rayleigh scattered light generated in a plurality of modes in an FMF is mixed with Rayleigh scattered light of $LP_{01}$ and Rayleigh scattered light of $LP_{11}$ at a certain mode conversion point (such as a connection point or cable bending) in an optical fiber transmission line. Therefore, the loss of each mode cannot be evaluated correctly. In particular, an obtained loss value is that of a mode with the smallest loss (a mode with a high intensity of Rayleigh scattering) among the plurality of modes and thus it may be erroneously determined from the evaluation of a transmission line that it is a good transmission line with a small loss.

The present disclosure has been made in view of the problems in the known art and it is an object of the present disclosure to provide an optical test system capable of accurately measuring a loss of each mode at each position of an optical fiber which propagates a plurality of modes.

Means for Solving the Problem

An optical fiber loss measuring apparatus described in an embodiment to solve the above problems is an optical fiber loss measuring apparatus that measures losses of a plurality of propagation modes at a plurality of positions of a target optical fiber to be measured which propagates a plurality of modes by inputting light, as probe light, having a first frequency of a predetermined mode of the plurality of modes to the target optical fiber to be measured through a near end of the target optical fiber to be measured and measuring an intensity of backward scattered light generated at each position of the plurality of positions of the target optical fiber to be measured using an Optical Time Domain Reflectometry (OTDR) technique, the optical fiber loss measuring apparatus including a crosstalk suppressing light input unit configured to input light of a different mode of the plurality of modes different from the predetermined mode, the different mode causing crosstalk to the probe light, to the target optical fiber to be measured through the near end as crosstalk suppressing light at a second frequency obtained by giving a frequency that is equivalent to a Brillouin frequency shift of the predetermined mode to the first frequency, a light separating unit configured to remove light of the second frequency from light that is output from the target optical fiber to be measured through the near end to separate light of the first frequency, and a propagation mode loss measuring unit configured to measure an intensity of the light that is separated to measure a loss of each propagation mode of the plurality of propagation modes at each position of the plurality of positions of the target optical fiber to be measured.

An optical fiber loss measuring method described in another embodiment is an optical fiber loss measuring method that measures losses of a plurality of propagation modes at a plurality of positions of a target optical fiber to be measured which propagates a plurality of modes by inputting light, as probe light, having a first frequency of a predetermined mode of the plurality of modes to the target optical fiber to be measured through a near end of the target optical fiber to be measured and measuring an intensity of backward scattered light generated at each position of the plurality of positions of the target optical fiber to be measured using an Optical Time Domain Reflectometry (OTDR) technique, the optical fiber loss measuring method including the step of inputting the probe light to the target optical fiber to be measured through the near end and light of a different mode of the plurality of modes different from the predetermined mode, the different mode causing crosstalk to the probe light, to the target optical fiber to be measured through the near end as crosstalk suppressing light at a second frequency obtained by giving a frequency that is equivalent to a Brillouin frequency shift of the predetermined mode to the first frequency, removing light of the second frequency from light that is output from the target optical fiber to be measured through the near end to separate light of the first frequency, and measuring an intensity of the light that is separated to measure a loss of each propagation mode of the plurality of propagation modes at each position of the plurality of positions of the target optical fiber to be measured.

DESCRIPTION OF EMBODIMENTS

Hereinafter, embodiments of the present disclosure will be described in detail with reference to the drawings.

An optical fiber loss measuring apparatus described in embodiments is an optical fiber loss measuring apparatus that measures losses of a plurality of propagation modes at a plurality of positions of a target optical fiber to be measured which propagates a plurality of modes by inputting light, as probe light, having a first frequency of a predetermined mode of the plurality of modes to the target optical fiber to be measured through a near end of the target optical fiber to be measured and measuring an intensity of backward scattered light generated at each position of the plurality of positions of the target optical fiber to be measured using an Optical Time Domain Reflectometry (OTDR) technique. The optical fiber loss measuring apparatus includes a crosstalk suppressing light input unit, a light separating unit, and a propagation mode loss measuring unit which will be described below. The crosstalk suppressing light input unit selects a different mode of the plurality of modes different from the mode that causes crosstalk to the probe light and inputs, to the target optical fiber to be measured through the near end, crosstalk suppressing light having a second frequency obtained by giving a frequency that is equivalent to a Brillouin frequency shift of the mode to the first frequency. The light separating unit removes light of the second frequency from light that is output from the target optical fiber to be measured through the near end to separate light of the first frequency. The propagation mode loss measuring unit measures an intensity of the light that is separated to measure a loss of each propagation mode of the plurality of propagation modes at each position of the plurality of positions of the target optical fiber to be measured.

With this configuration, it is possible to measure a loss of each propagation mode of an optical fiber transmission line in a distributed and non-destructive manner, mainly in few mode optical fibers or an optical transmission system using the same.

First Embodiment

Figure 1:
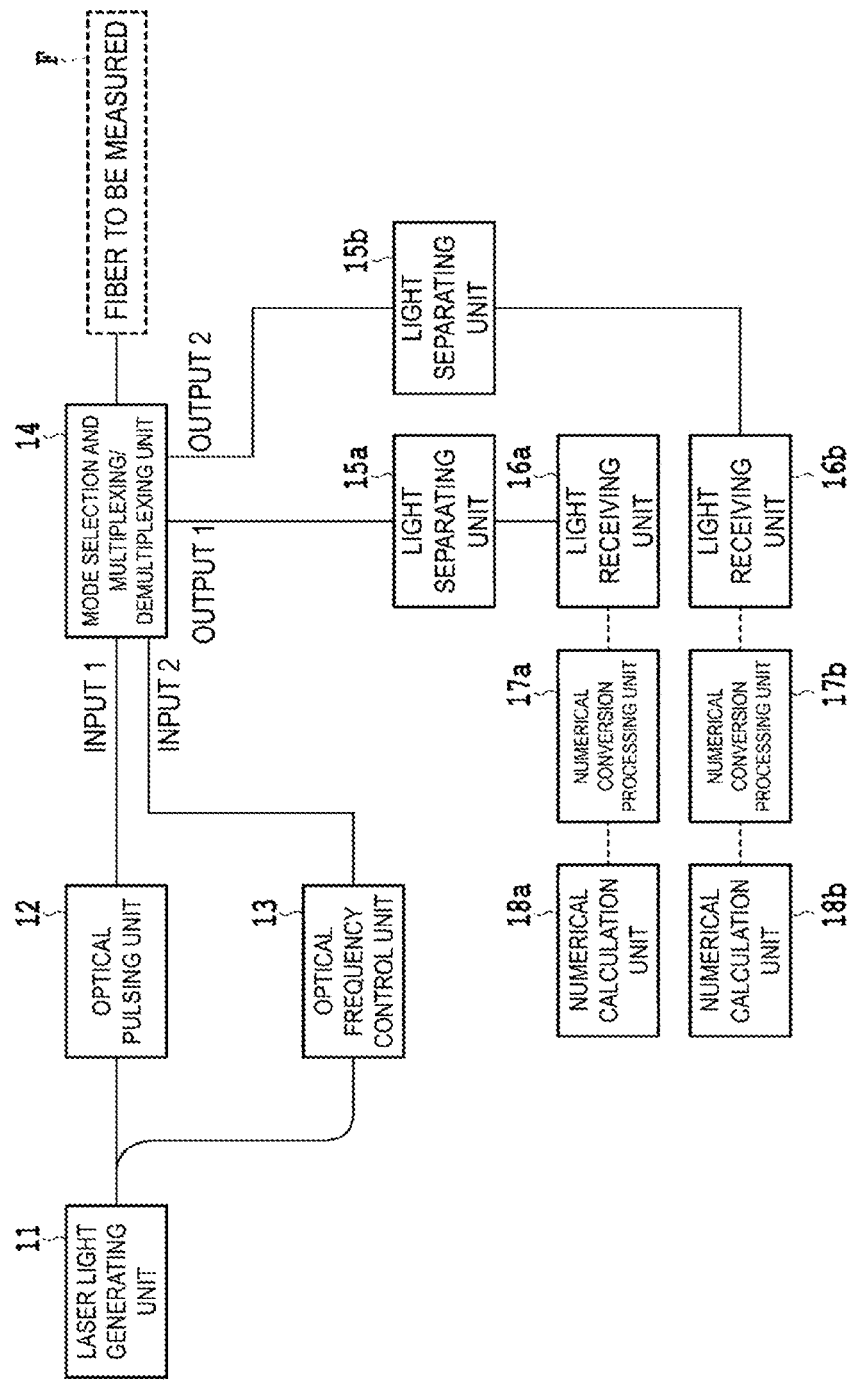
FIG. 1 is a block diagram illustrating an example of an optical fiber loss measuring apparatus of a first embodiment.

FIG. 1 is a block diagram illustrating an example of an optical fiber loss measuring apparatus of a first embodiment. A configuration of the optical fiber loss measuring apparatus illustrated in FIG. 1 is described below. The optical fiber loss measuring apparatus includes a laser light generating unit 11, an optical pulsing unit 12 and an optical frequency control unit 13 whose inputs are connected to the laser light generating unit 11, a mode selection and multiplexing/demultiplexing unit 14 whose inputs are connected to outputs of the optical pulsing unit 12 and the optical frequency control unit 13, light separating units 15a and 15b connected to outputs of the mode selection and multiplexing/demultiplexing unit 14, a light receiving unit 16a, a numerical conversion processing unit 17a, and a numerical calculation unit 18a connected in series to the light separating unit 15a, and a light receiving unit 16b, a numerical conversion processing unit 17b, and a numerical calculation unit 18b connected in series to the light separating unit 15b.

The mode selection and multiplexing/demultiplexing unit 14 has inputs 1 and 2, outputs 1 and 2, and an input/output portion connected to a near end of a target optical fiber to be measured F. The optical fiber to be measured F which is a measurement target is connected to the input/output portion of the mode selection and multiplexing/demultiplexing unit 14 of the optical fiber loss measuring apparatus. The input 1 of the mode selection and multiplexing/demultiplexing unit 14 is connected to the output of the optical pulsing unit 12 and the input 2 thereof is connected to the output of the optical frequency control unit 13. The output 1 of the mode selection and multiplexing/demultiplexing unit 14 is connected to the light separating unit 15a and the output 2 thereof is connected to the light separating unit 15b.

In the optical fiber loss measuring apparatus illustrated in FIG. 1, light output from the laser light generating unit 11 that generates coherent light is branched into two beams. One of the two beams is pulsed by the optical pulsing unit 12 and then a mode to be measured is selected by the mode selection and multiplexing/demultiplexing unit 14 and the selected mode is input to the near end of the optical fiber to be measured F as probe light. The other of the two beams is given at its low frequency side a frequency difference of about 10 to 11 GHz, which is equivalent to a Brillouin frequency shift of the target optical fiber to be measured, by the optical frequency control unit 13 and then a mode that causes crosstalk to the probe light is selected by the mode selection and multiplexing/demultiplexing unit 14 and the selected mode is input to the near end of the optical fiber to be measured F as crosstalk suppressing light. The crosstalk suppressing light is used to suppress crosstalk by causing a Brillouin loss with respect to the crosstalk of the probe light with Rayleigh scattered light of the probe light.

When the probe light and the crosstalk suppressing light have been input to the target optical fiber to be measured F through the near end thereof, Rayleigh scattered light or Brillouin scattered light is generated at any position of the target optical fiber to be measured and is output from the target optical fiber to be measured F through the near end thereof.

The mode selection and multiplexing/demultiplexing unit 14 selects a mode of light that is output from the target optical fiber to be measured F through the near end thereof and outputs the selected mode through the output 1 or the output 2. The mode selection and multiplexing/demultiplexing unit 14 selects light of the same mode as the input 1, that is, light of the same mode as the probe light, and outputs it through the output 1. The mode selection and multiplexing/demultiplexing unit 14 selects light of the same mode as the input 2, that is, light of the same mode as the crosstalk suppressing light, and outputs it through the output 2.

The light separating units 15a and 15b remove, from the light output through the output 1 and the output 2, reflected light of the crosstalk suppressing light including Rayleigh scattered light caused by the crosstalk suppressing light to separate only Rayleigh scattered light of a desired mode and input the separated light to the light receiving units 16a and 16b. The light receiving units 16a and 16b convert the separated light into electric signals.

The light separating units 15a and 15b remove light of frequency components of the crosstalk suppressing light and transmit light of frequency components of the probe light. Specifically, optical filters can be used as the light separating units 15a and 15b.

The light receiving units 16a and 16b appropriately amplify received electric signals and the numerical conversion processing units 17a and 17b convert the amplified electrical signals into numerical values. Then, Rayleigh scattered light for each distance is calculated using the numerical calculation units 18a and 18b.

In the optical fiber loss measuring apparatus of the present embodiment, the optical frequency control unit 13 in FIG. 1 appropriately changes the frequency difference between the probe light and the crosstalk suppressing light and the numerical calculation unit 18a corresponding to the output 1 and the numerical calculation unit 18b corresponding to the output 2 acquire Rayleigh scattered light, whereby frequency characteristics of the intensity of Rayleigh scattered light can be acquired for each output.

Incidentally, considering a stimulated Brillouin scattering phenomenon in the FMF, the Brillouin frequency shift $v_b$ in any mode is given as follows.

Math. 1

$$v_b = \frac{2 n_i V_a}{\lambda} \quad \text{(Equation 1)}$$

Here, $n_i$ is the effective index of any mode, $V_a$ is the effective velocity of an acoustic wave, and $\lambda$ is the wavelength. In the FMF, this means that the Brillouin frequency shift differs depending on which mode propagates and the Brillouin spectrum at any position in each obtained mode has a different peak for each mode. The optical fiber loss measuring apparatus of the present embodiment suppresses Rayleigh scattered light in an unnecessary mode by utilizing the fact that the Brillouin spectrum has a different peak for each mode.

An FMF that propagates two modes, $LP_{01}$ and $LP_{11}$, will be considered for the sake of simplicity. Even when probe light with optical power $P_r$ has an amplitude in $LP_{11}$, its Rayleigh scattered light will have power of $P_{B01}$ and $P_{B11}$ in both $LP_{01}$ and $LP_{11}$.

Math. 3

$$-\frac{\partial P_{B01}}{\partial z} = -g_{B01-01}(f_B)P_{01}P_{B01} - \alpha_{01}P_{01}, \quad \text{(Equation 3)}$$

Math. 4

$$-\frac{\partial P_{B11}}{\partial z} = -g_{B11-01}(f_B)P_{11}P_{B01} - \alpha_{11}P_{11}. \quad \text{(Equation 4)}$$

Here, $m_{ij}$ and $R_{ij}$ are coefficients for mode conversion from the $LP_{j1}$ mode to the $LP_{i1}$ mode due to a mode coupling point and Rayleigh scattering at position z, respectively. Here, crosstalk suppressing light whose frequency is set to be lower by the frequency difference $f_B$ is incident on the $LP_{01}$ mode. At this time, the Rayleigh scattered light represented by Equations (2) are as follows due to Brillouin loss interaction.

Math. 2

$$P_{B01} = m_{00}(z)R_{00}P_r \quad \text{(Equations 2)}$$
$$P_{B11} = m_{10}(z)R_{10}P_r$$

In the above (Equation 3) and (Equation 4), $g_{Bx-y}$ is a Brillouin scattering coefficient due to Rayleigh scattering of $LP_x$ and crosstalk suppressing light of $LP_y$, $P_{i1}$ is the power of crosstalk suppressing light of $LP_{i1}$ at the position z, and $\alpha_{i1}$ is a loss coefficient of $LP_{i1}$.

Here, the power $P_{B01}$ of Rayleigh scattered light of $LP_{01}$ which is desired to be suppressed can be reduced by setting the frequency difference $f_B$ between the Rayleigh scattered light $P_{B01}$ of $LP_{01}$ and the crosstalk suppressing light $P_{01}$ of $LP_{01}$ such that a great Brillouin loss is caused by the Rayleigh scattered light $P_{B01}$ of $LP_{01}$ and the crosstalk suppressing light $P_{01}$ of $LP_{01}$. At this time, the Rayleigh scattered light power of $LP_{11}$ does not decrease because a frequency difference $f_B$ at which the effect is strong for the Rayleigh scattered light power of $LP_{11}$ is different from the above.

By controlling the frequency difference between the probe light and the crosstalk suppressing light in this way, it is possible to accurately receive only Rayleigh scattered light in a desired mode. In the above case, the loss of the desired mode can be obtained based on the intensity waveform of the Rayleigh light scattered light of $LP_{11}$ with respect to the distance.

Figure 2:
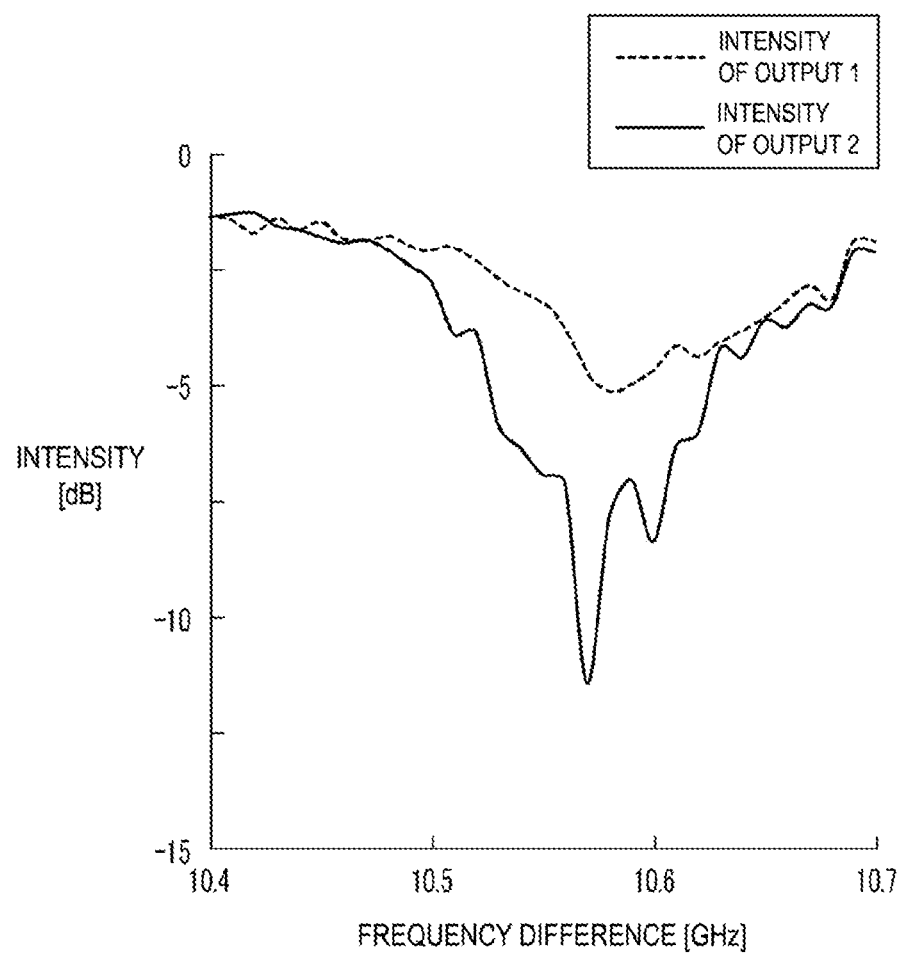
FIG. 2 is a diagram illustrating an example of spectrums of two outputs.

Here, the suppression of an unnecessary mode can be determined using the values of (Equation 3) and (Equation 4), that is, the output values of the numerical calculation units 18a and 18b, for example, in a manner such that the output of the numerical calculation unit 18b is minimized. It is also possible to use the case where the ratio of the output of the numerical calculation unit 18b to the output of the numerical calculation unit 18a is minimized. That is, a frequency difference for acquiring a loss of a desired mode can be determined based on the intensity of Rayleigh scattered light observed by the numerical calculation unit 18b (the intensity of $LP_{01}$ in the case described in the present embodiment) with respect to the frequency difference as illustrated in FIG. 2.

Figure 3:
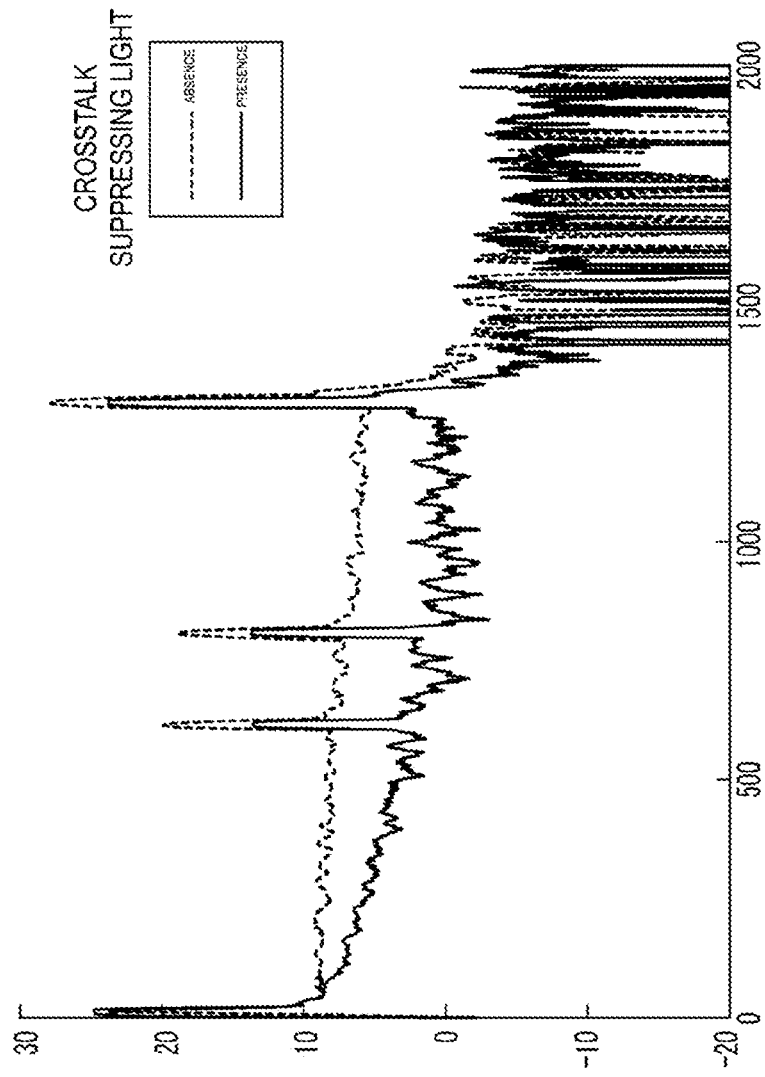
FIG. 3 is a diagram illustrating an example of a Rayleigh scattering waveform of an unnecessary mode.
Figure 4:
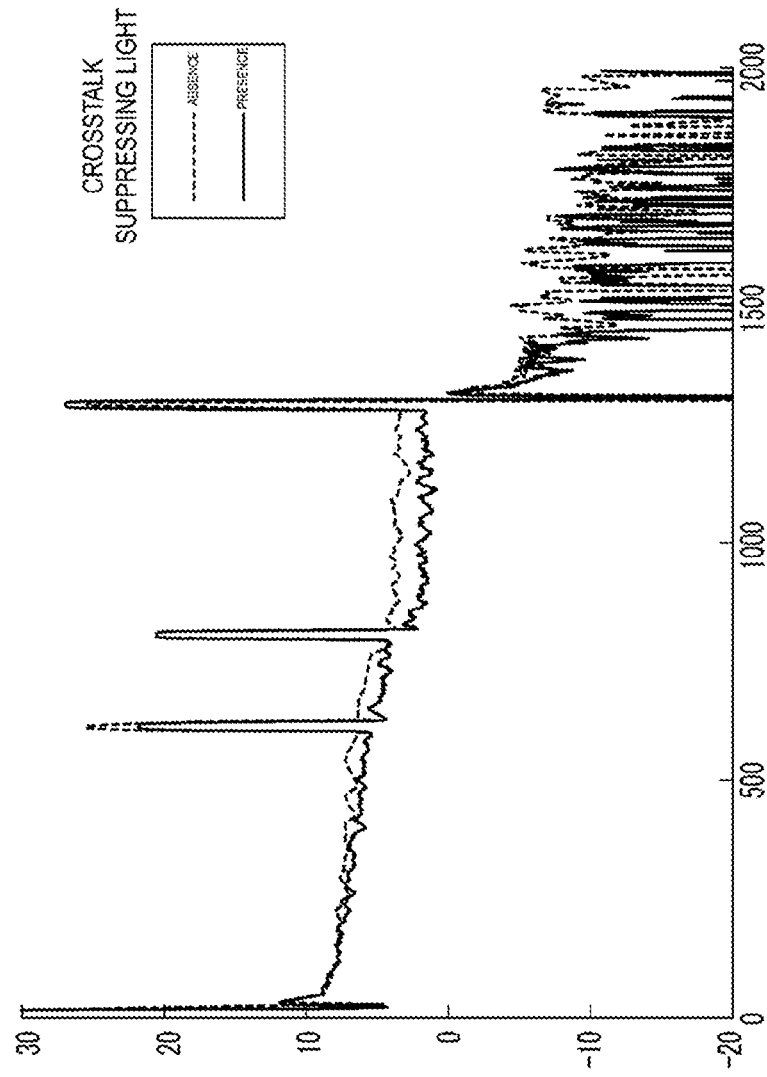
FIG. 4 is a diagram illustrating an example of a Rayleigh scattering waveform of a desired mode.

FIGS. 3 and 4 illustrate intensity waveforms with respect to the distance of Rayleigh scattered light of the unnecessary mode ($LP_{01}$) (FIG. 3) and the desired mode ($LP_{11}$) (FIG. 4) at a frequency difference that minimizes the intensity of the Rayleigh scattered light obtained by the numerical calculation unit 18b. Here, the difference between solid and dashed lines indicates the presence or absence of crosstalk suppressing light. The intensity of the Rayleigh scattered light of $LP_{01}$ (the unnecessary mode) illustrated in FIG. 3 is suppressed by the crosstalk suppressing light, but that of $LP_{11}$ (the desired mode) illustrated in FIG. 4 is not suppressed.

According to the optical fiber loss measuring apparatus of the present embodiment, it is possible to suppress an unnecessary mode through incidence of crosstalk suppressing light and thus to acquire the intensity waveform of Rayleigh scattered light only in a desired mode.

According to the optical fiber loss measuring apparatus of the present embodiment, Rayleigh scattered light other than that of a desired mode in Rayleigh scattered light generated in a plurality of modes can be suppressed in a target optical fiber, and only a received loss in the desired mode can be measured in a non-destructive manner. This makes it possible to measure a loss due to a connection point, a device, or the like in a transmission line for each mode.

Second Embodiment

Figure 5:
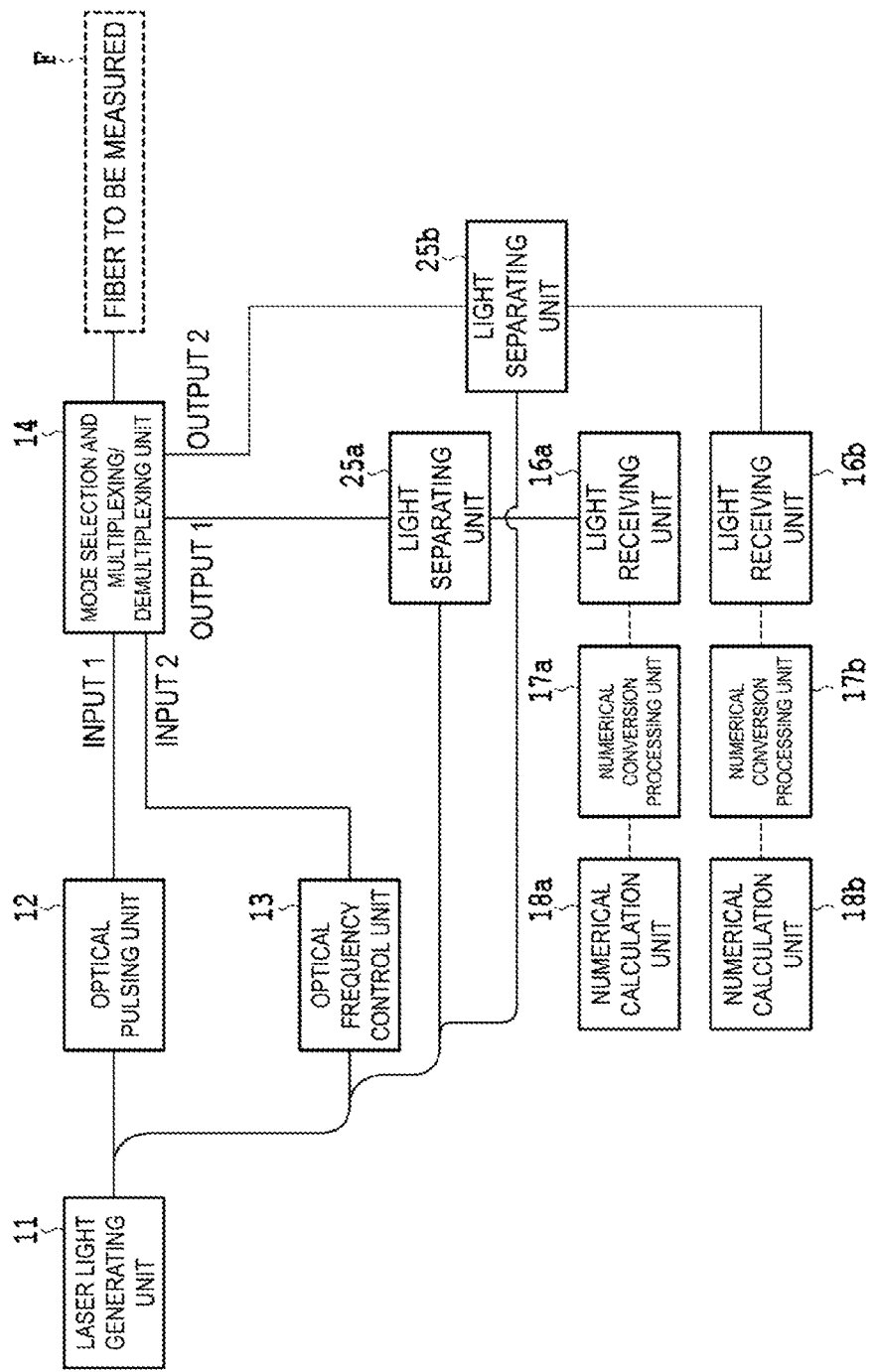
FIG. 5 is a block diagram illustrating an example of an optical fiber loss measuring apparatus of a second embodiment.

FIG. 5 is a block diagram illustrating an example of an optical fiber loss measuring apparatus of a second embodiment. The optical fiber loss measuring apparatus of the first embodiment has been described with reference to an example in which the light separating units 15a and 15b such as frequency filters are used as units for removing light of frequency components of the crosstalk suppressing light. However, the optical fiber loss measuring apparatus of the present embodiment uses light separating units 25a and 25b based on coherent detection instead of the light separating units 15a and 15b. The other components are the same as those of the optical fiber loss measuring apparatus of the first embodiment and thus the description thereof will be omitted.

The coherent detection units of the light separating units 25a and 25b may acquire the intensities of frequencies converted into baseband by performing coherent detection with respect to output light of the output 1 or the output 2 using light of the optical frequency of the input 1, that is, light of the optical frequency of the laser light generating unit, as reference hole to remove light of frequency components of crosstalk suppressing light and thus separating the intensities of Rayleigh scattered light.

The optical fiber loss measuring apparatus of the above embodiments has been described with reference to examples in which it includes the optical pulsing unit 12, the optical frequency control unit 13, the mode selection and multiplexing/demultiplexing unit 14, the light separating units 15a and 15b (the light separating units 25a and 25b), the light receiving units 16a and 16b, the numerical conversion processing units 17a and 17b, and the numerical calculation units 18a and 18b. However, the above configurations are examples and the optical fiber loss measuring apparatus can use any units as long as it is configured similar to the optical fiber loss measuring apparatus of the above embodiments such that an optical frequency difference corresponding to a Brillouin frequency shift can be made between a probe light pulse and crosstalk suppressing light and any mode can be selected and excited to extract an intensity signal of Rayleigh scattered light in the time domain.

According to the optical fiber loss measuring apparatus of the present embodiment, Rayleigh scattered light other than that of a desired mode in Rayleigh scattered light generated in a plurality of modes can be suppressed in a target optical fiber, and only a received loss in the desired mode can be measured in a non-destructive manner. This makes it possible to measure a loss of each mode for a connection point, a device, or the like in a transmission line.

According to the optical fiber loss measuring apparatus of the above embodiments, it is possible to suppress unnecessary modes before mode conversion points because crosstalk in the fiber to be measured can be suppressed using the Brillouin loss phenomenon, unlike Non Patent Literatures 1 and 2. In this respect, it is possible to measure the correct loss of each mode unlike Non Patent Literatures 1 and 2.

Further, according to the optical fiber loss measuring apparatus of the above embodiments, it is possible to measure the correct loss of each mode by measuring the loss of a desired mode based on the intensity waveform of Rayleigh scattered light obtained in the desired mode at a frequency difference which minimizes the intensity of Rayleigh scattered light in an unnecessary mode.

The optical fiber loss measuring apparatus of the above embodiments has been described with regard to a few mode fiber which propagates a plurality of modes. However, it is also possible to use light in a short wavelength band which propagates in a plurality of modes in a single mode optical fiber.

REFERENCE SIGNS LIST

11 Laser light generating unit
12 Optical pulsing unit
13 Optical frequency control unit
14 Mode selection and multiplexing/demultiplexing unit
15a, 15b Light separating unit
16a, 16b Light receiving unit
17a, 17b Numerical conversion processing unit
18a, 18b Numerical calculation unit
25a, 25b Light separating unit

The invention claimed is:

1. An optical fiber loss measuring apparatus that measures losses of a plurality of propagation modes at a plurality of positions of a target optical fiber to be measured which propagates a plurality of modes by inputting light, as probe light, having a first frequency of a predetermined mode of the plurality of modes to the target optical fiber to be measured through a near end of the target optical fiber to be measured and measuring an intensity of backward scattered light generated at each position of the plurality of positions of the target optical fiber to be measured using an Optical Time Domain Reflectometry (OTDR) technique, the optical fiber loss measuring apparatus comprising:

a crosstalk suppressing light input unit configured to input light of a different mode of the plurality of modes different from the predetermined mode, the different mode causing crosstalk to the probe light, to the target optical fiber to be measured through the near end as crosstalk suppressing light at a second frequency obtained by giving a frequency that is equivalent to a Brillouin frequency shift of the predetermined mode to the first frequency;

a light separating unit configured to remove light of the second frequency from light that is output from the target optical fiber to be measured through the near end to separate light of the first frequency; and a propagation mode loss measuring unit configured to measure an intensity of the light that is separated to measure a loss of each propagation mode of the plurality of propagation modes at each position of the plurality of positions of the target optical fiber to be measured.

2. The optical fiber loss measuring apparatus according to claim 1, wherein the light separating unit includes an optical bandpass filter that passes only light of the first frequency.

3. The optical fiber loss measuring apparatus according to claim 1, wherein the light separating unit includes a coherent detection unit configured to perform coherent detection on light that is output from the optical fiber through the near end using light of the first frequency as local light to separate only light of the first frequency.

4. The optical fiber loss measuring apparatus according to claim 1, wherein the crosstalk suppressing light input unit is configured to set the second frequency to a frequency which minimizes an output intensity of light in the different mode which is a mode of the plurality of modes identical to a mode of the crosstalk suppressing light.

5. An optical fiber loss measuring method that measures losses of a plurality of propagation modes at a plurality of positions of a target optical fiber to be measured which propagates a plurality of modes by inputting light, as probe light, having a first frequency of a predetermined mode of the plurality of modes to the target optical fiber to be measured through a near end of the target optical fiber to be measured and measuring an intensity of backward scattered light generated at each position of the plurality of positions of the target optical fiber to be measured using an Optical Time Domain Reflectometry (OTDR) technique, the optical fiber loss measuring method comprising the steps of:

inputting the probe light to the target optical fiber to be measured through the near end and light of a different mode of the plurality of modes different from the predetermined mode, the different mode causing crosstalk to the probe light, to the target optical fiber to be measured through the near end as crosstalk suppressing light at a second frequency obtained by giving a frequency that is equivalent to a Brillouin frequency shift of the predetermined mode to the first frequency;

removing light of the second frequency from light that is output from the target optical fiber to be measured through the near end to separate light of the first frequency; and measuring an intensity of the light that is separated to measure a loss of each propagation mode of the plurality of propagation modes at each position of the plurality of positions of the target optical fiber to be measured.

6. The optical fiber loss measuring method according to claim 5, wherein the removing step includes separating only light of the first frequency through an optical bandpass filter that passes only light of the first frequency.

7. The optical fiber loss measuring method according to claim 5, wherein the removing step includes performing coherent detection on light that is output from the optical fiber through the near end using light of the first frequency as local light to separate only light of the first frequency.

8. The optical fiber loss measuring method according to claim 5, wherein the inputting step includes setting the second frequency to a frequency which minimizes an output intensity of light in the different mode which is a mode of the plurality of modes identical to a mode of the crosstalk suppressing light.

* * * * *